F. J. FARRELL.
VEHICLE FENDER.
APPLICATION FILED NOV. 21, 1916.
1,217,583.
Patented Feb. 27, 1917.
3 SHEETS—SHEET 1.
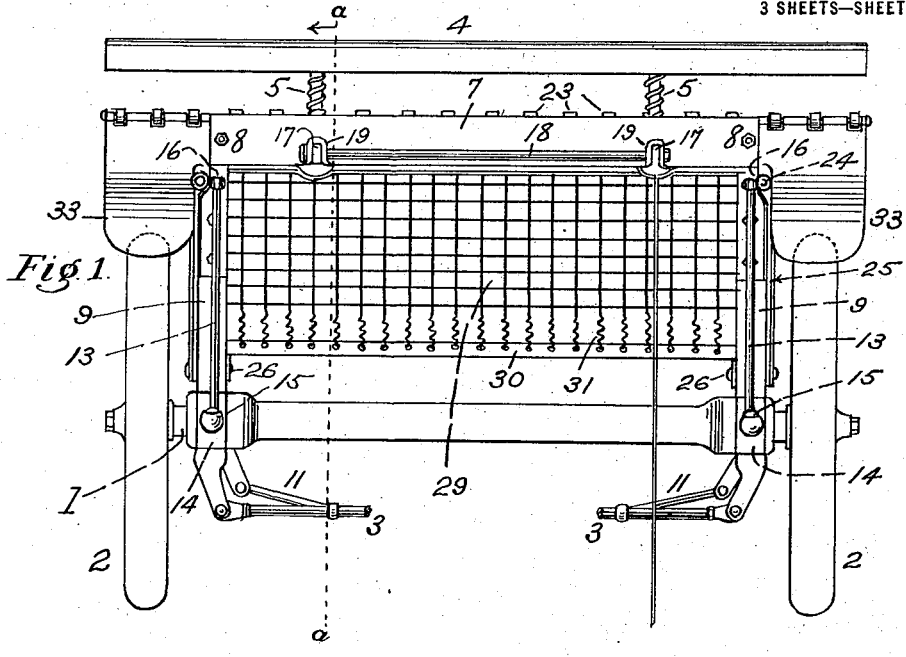
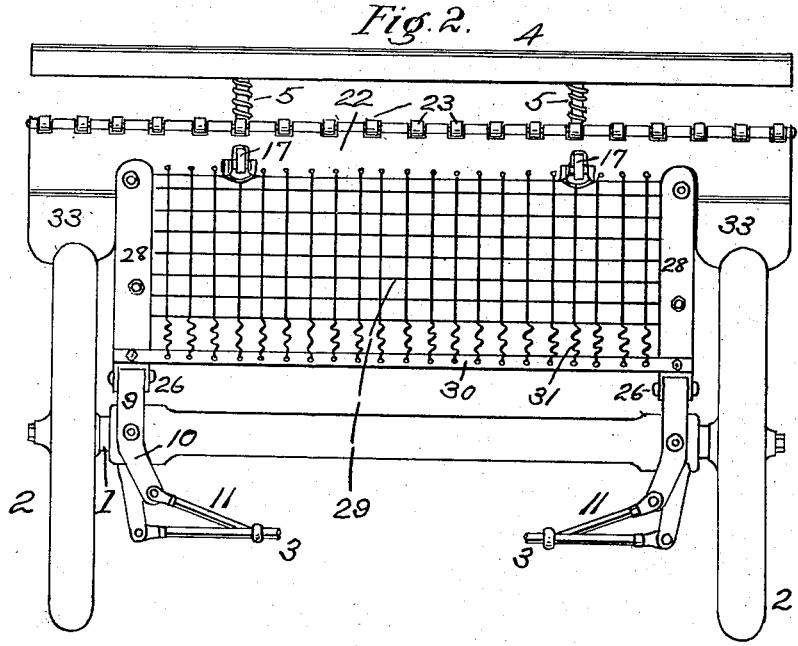
Inventor:
Francis J. Farrell,
by John Elias Jones,
Attorney.

F. J. FARRELL.
VEHICLE FENDER.
APPLICATION FILED NOV. 21, 1916.
1,217,583.
Patented Feb. 27, 1917.
3 SHEETS—SHEET 2.
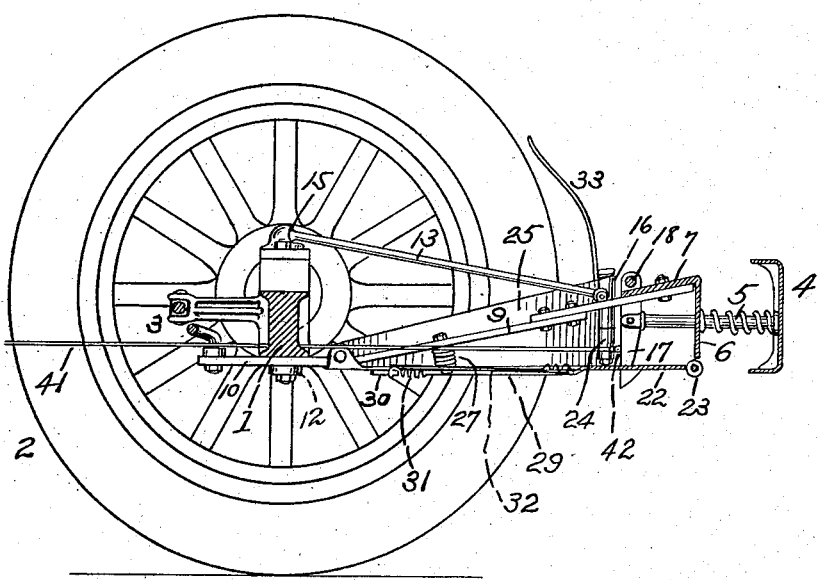
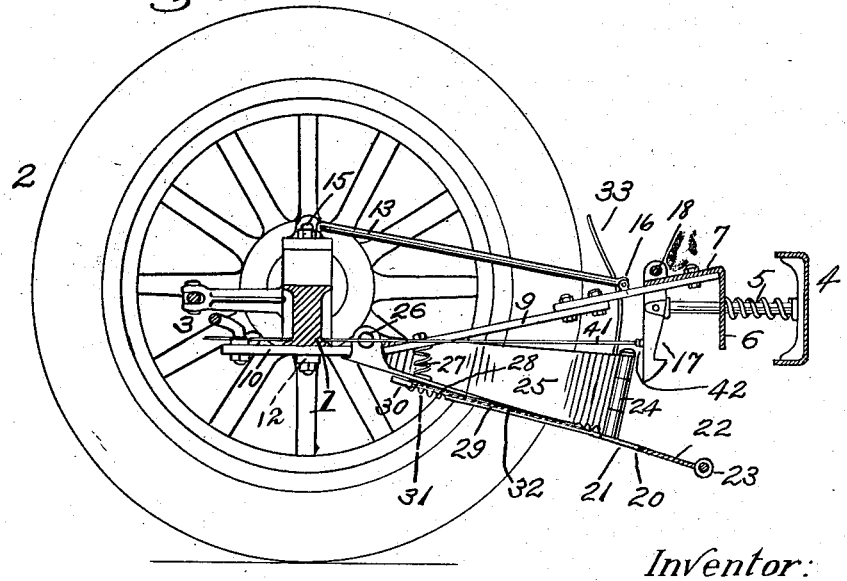
Inventor:
Francis J. Farrell,
by John Elias Jones,
Attorney.

F. J. FARRELL.
VEHICLE FENDER.
APPLICATION FILED NOV. 21, 1916.
1,217,583.
Patented Feb. 27, 1917.
3 SHEETS—SHEET 3.
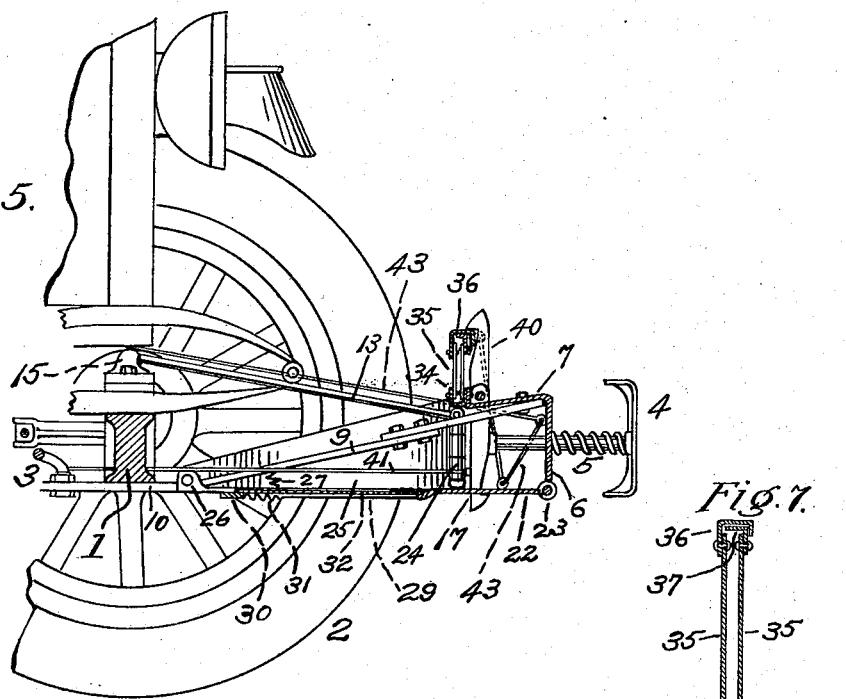
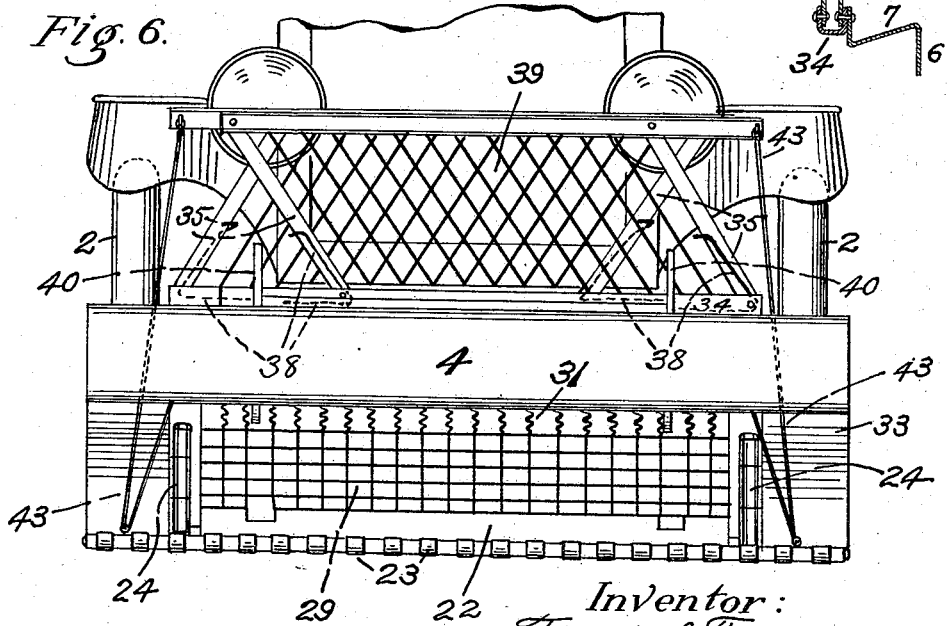

UNITED STATES PATENT OFFICE.

FRANCIS J. FARRELL, OF CINCINNATI, OHIO.

VEHICLE-FENDER.

1,217,583.  Specification of Letters Patent.  Patented Feb. 27, 1917.

Application filed November 21, 1916. Serial No. 132,696.

*To all whom it may concern:*

Be it known that I, FRANCIS J. FARRELL, a citizen of the United States of America, and a resident of Cincinnati, in the county of Hamilton and State of Ohio, have invented a certain new and useful Improvement in Vehicle-Fenders, of which the following is a specification.

This invention relates to buffer devices adapted for use at the fore-end of a vehicle to cushion or moderate the shock of impact occasioned by the collision of said fore-end of the vehicle with objects in the path ahead and, more especially, with living objects that are liable to become seriously injured, suitable means being provided to automatically drop at the instant of collision for gathering-up or catching said living object to prevent its getting beneath the wheels or in the running-gear of the vehicle for possibly still greater injury than that of the collision itself.

The principal object of the invention herein is to provide elastic buffing-means that automatically actuate drop-fender means at the fore-end of an automobile to offset any collision with said fore-end of the vehicle as well as to scoop or pick up the object collided with so as to prevent its getting under the wheels, or into the running-gear, or striking the radiator or the lamps of the vehicle that would otherwise be occasioned by the sudden impact of the vehicle with the obstructing object ahead, the details of structure of such several means of safety to said object ahead, as well as to the vehicle itself, being hereinafter fully described in detail and then more particularly pointed out in the claims.

In the accompanying sheets of drawings, Figure 1 is a plan view showing the fore-end of the running gear of an automobile with my improved buffer and fender devices in normal position thereon, (but not including the upper guard or fender that operates vertically for protection against the radiator, the lamps and the upper part of the vehicle above the running-gear and shown in several of the views on Sheet 3 hereof); Fig. 2, a bottom plan view; Fig. 3, a sectional elevation, taken on the line *a, a* of Fig. 1 and showing the buffer and fender devices in raised-position ready to be dropped for possible scooping-action; Fig. 4, a sectional elevation taken on the same line as that of Fig. 3, but showing the fender or mat device in lowered or dropped position for scooped-use; Fig. 5, a sectional elevation similar to Fig. 3, but showing in addition thereto my improved vertically-operating guard-device that surmounts the fender supporting-frame and is actuated by the same means as that of the fender when the buffer-means is collided with, such vertically-operating guard being shown closed and under latched-tension ready for the release of the latch devices and for instant rising upwardly when the buffer-means releases said latch devices and thereby protects the object collided with from contact with the upper works of the vehicle, such works including the radiator, the lamps and the springs, fragments of which upper works are also shown in this view; Fig. 6, a front elevation of Fig. 5, but showing the fender and guard devices as they appear in use, with said fender dropped into scooping or picking-up position and the guard device raised into further buffing or cushioning position; and Fig. 7, a cross-section of the open upper-guard seen in Fig. 6, but on a slightly larger scale, with the connecting-bars in section and omitting the spring and wire-mat parts thereof.

1 indicates the fore-axle; 2, 2 the front-wheels; and 3 the pivotal connecting-rod devices used for coupling the said front-wheels in steering.

4 indicates a spring-buffer having plunger stems or rods 5 that extend through a pendent flange-member 6 of the horizontal main-member 7 of a transverse, angular, metal frame that is pivotally-connected at its opposite ends 8 to the outer ends of the forwardly-projecting arms 9, the latter, in turn, extending rearwardly at 10 beneath the axle to which they are pivotally-connected at 12, as best shown in Figs. 3 and 4. The extreme rear-ends of the parts 10 are pivotally-connected by means of links 11 to the connecting or coupling bar 3, as best shown in Fig. 2, the object thereof being to simultaneously hinge or swing the buffer-frame laterally with the steering-mechanism and thereby maintain the proper alinement between the lower-fender device and the front wheels when shifting from a straight-line ahead, or on curves, when the vehicle is running.

13 indicates connecting tie-rods, extending rearwardly from the fore-ends of the arms 9 to the end-sills 14, to which latter they are pivotally-connected by means of ball-and-socket joints 15, they being pivotally-connected at 16, at their said fore-ends, as best shown in Figs. 1, 3 and 4. These connecting-ties 13 duly stiffen and support the buffer-frame to properly provide for the said lateral-swinging action thereof.

A pair of vertical hook-arms 17 is hung pendent from a transverse-shaft 18, the latter being journaled in boxes 19 that are provided on the rear edge of the horizontal-member 7 of the buffer-frame. The lower hook-ends of said vertical hook-arms 17 are disposed forwardly and are adapted to engage the rear edge 20 of the recessed-parts 21 that are made in a transverse fender-bar 22. The said vertical hook-arms 17 are pivotally-connected mid-length with the inner ends of the plunger-rods 5 of the buffer bar or frame 4.

The fender-bar 22 has a series of rollers 23 along its fore-edge and is pivotally-connected at 24 near its opposite ends to the fore-ends of the rearwardly-extending side-fenders 25, the latter, in turn, being vertically-hinged at 26 at their rear ends to the rearwardly-extending portions 10 of the buffer-arms 9, as best seen in Figs. 3 and 4. Expansion-springs 27 are placed between the said arms 9 and the lower, inwardly-flanged portions 28 of said side-fenders 25 to automatically and positively augment the dropping of the fender devices from their raised-posititon seen in Fig. 3 to the lowered-position seen in Fig. 4, when such fender devices have been released by the collision or contact of the buffer 4 that retracts the hook-arms 17 from engagement with the transverse fender-bar.

29 indicates a resilient-mat or spring-wire surface stretched between the transverse fender-bar 22 and a rear transverse-bar 30 that connects the flanged portions 28 of the side-fenders 25 near the rear pivotal-ends of the latter. This resilient mat is intended to instantly catch or pick up any objects, particularly living ones, that may be guided into or picked up by the said fender-bar 22 when it has been automatically dropped on its hinges by the impact of a collision or contact with the front face of the buffer-bar 4, and relieve said object from shock or injury attendant upon said collision. Said mat may be composed of woven wire, or of crossed wires, part of which crossed-wires may have coil-spring ends 31, as best seen in Figs. 1, 2, 3 and 4.

An auxiliary flexible imperforate screen 32 of canvas or like fabric is preferably placed between the upper and lower layer of wires of the double form of fender-mat as shown in Figs. 3, 4 and 5 only, for preventing dust, mud and other foreign matter from the roadway entering the radiator or otherwise lodging in the fore part of the vehicle.

33, 33 indicate a pair of rearwardly-extending side-fenders at the opposite ends of the fender-bar 22, to divert colliding objects from the wheels of the vehicle that do not happen to lodge on the said fender-mat and serving to some extent at least in protecting said objects from greater injury under said wheels, although not as fully cushioning the blow of collision as in the manner provided by said fender-mat.

The rollers 23 provided along the fore-edge of the fender-bar 22 are intended to facilitate the riding of said fore-edge of the fender-bar over the roadway and thereby overcome ordinary obstructions in the path thereof when said fender-bar has been dropped or lowered and, also, to allow for any unevenness in the roadway or pavement over which the vehicle is running.

The vertical hook-arms 17 are duly secured at their upper ends to the opposite ends of the transverse shaft 18 so that they act simultaneously or in harmony, thereby assuring the hinging or dropping of the fender throughout its length at the time of collision and without danger of impingement of the hinge-connections at the rear-ends of the side-fenders 25, which impingement or irregularity in the operation of the side-fenders on said hinge-connections, at either end of the fender, might occur if said hook-arms 17 were to be suspended from independent bearings and without the use of the connecting-shaft 18.

In Figs. 5, 6 and 7, I have shown an auxiliary device for use as a guard above the lower safety-fender line to protect said colliding objects from injury by further collision with the radiator, or the lamps, or the springs, or other parts of the upper portion of the vehicle in the event that such colliding objects, after being struck by the buffer 4, are not diverted downwardly toward the dropped fender or lower safety-device but are diverted or thrown upwardly toward said upper works of the vehicle. This upper-guard is composed of a lower, transverse channel-iron 34 that is preferably made integral with the member 7 of the buffer-frame and has a pair of spaced, sloping connecting-bars 35 pivotally-mounted at their lower ends to each of the upright limbs of the channel-iron, and which connecting-bars 35 are pivotally-connected at their upper ends to overlapping, angular transverse-bars 36 and 37, the latter forming freely-engaging guide-members that slide longitudinally one within the other but transversely to the length of the vehicle. Said pivotal connecting-bars 35 and said upper transverse-bars 36, 37, are folded or closed, "lazy-tongs" fashion, adjacent the hollow of the lower channel-iron 34 when in normal position, and springs 38 are provided to augment the opening or raising of said connecting-bars and upper transverse-bars, together with a wire-mat structure 39 that is provided between said lower channel-iron and said upper transverse-bars. Said mat 39 is provided to cushion the blow of the object that is diverted upwardly from the buffer 4 and prevents its further flight into the fore or upper works of the vehicle. Said mat 39 of the upper-guard device is made up of wires that slope in opposite directions on the frames provided by the pairs of connecting-bars and the upper transverse-bars, together with the upright sides of the lower channel-bar and readily fold or collapse when said upper-guard is folded into normal position and just as readily thrown open when the guard opens on collision of the buffer 4 with objects ahead.

Upright hook-extensions 40, disposed rearwardly, are provided at the upper ends of the lower hook-arms 17 to secure the upper-guard device in closed, normal position, as shown in said Fig. 5, and to be simultaneously rocked or released from engagement when said lower hook-arms 17 are depressed and released by contact of the buffer 4 with objects in the path ahead, whereby the ready release of the spring-actuated mat-portion of said upper-guard is effected and the safety feature is provided for catching and cushioning the said colliding object in its flight.

41 indicates a rod or cord leading from the seat of the vehicle forwardly to one of the hook-arms 17, as shown at 42 in Figs. 3 and 4, such connection with one of said hook-arms being sufficient for drawing both of the hooks 17 rearwardly in connection with their coupling rock-shaft 18 and to positively release the hooks from engagement with the fender-bar 22 in the event the driver of the vehicle sees an obstructing object ahead before reaching it and, also in the possible event of the buffer 4 failing to act on collision with objects ahead. Said rod or cord 41 is purely an auxiliary or emergency one, however, that can be used by the driver of the vehicle at any time without depending on the compression of the buffer 4 that might be too high for some objects that it would be desired to pick up with the fore-edge of the fender-bar 22 and save from further injury or harm.

The lower-fender device can, of course, be used without the upper-guard device on trucks where it would not be feasible, and as shown in Figs. 3 and 4. The lower-fender device and the upper-guard device may both be connected by means of cables 43 with the driver's seat, such cables being suitably secured to the said lower-fender and upper-guard as best seen in Figs. 5 and 6 only, and whereby both devices can be simultaneously restored to normal position after dropping and rising, respectively, (purposely or accidentally) into using position.

I claim:—

1. In a safety-fender device for vehicles, the combination of a resilient buffer having plunger stems or rods, a transverse rock-shaft mounted on the fender-frame, a pair of pendent hook-arms operatively-connected to said plunger-stems and both fixedly-carried by said rock-shaft so that they both act simultaneously and in unison, a hinged fender-mat having a transverse bar or plate along its fore edge and normally held in elevated-position by the said hook-arms when the latter are in closed-engagement with said transverse-bar and adapted to pivotally-drop into using or scooping position on contact of the buffer with objects in its path ahead, and spring-actuated means for positively hinging or dropping said fender-mat into said using-position when released.

2. In a safety-fender device for vehicles, the combination of a resilient buffer having plunger-stems or rods, hook-arms operatively-connected to said plunger-stems, a hinged fender-mat having a transverse fore bar or plate, a series of rollers along the fore scooping-edge of said transverse plate, said fender-mat being normally held in elevated-position by said hook-arms and adapted to pivotally-drop into using-position on contact of the buffer with objects in its path ahead, and positive actuating-means for the dropping of said hinged fender into using-position.

3. In a safety-fender device for vehicles, the combination of a resilient or spring buffer having rearwardly-extending plunger stems or rods, a transverse rock-shaft, hook-arms fixed to said rock-shaft and operatively-connected to said plunger-stems, a transverse fender-mat hinged at its rear portion and having a fore scooping or picking-up edge adapted to be normally held elevated above the roadway by means of said hook-arms whose release permits the instant dropping of said fore-edge of the fender into using or picking-up position when the said buffer contacts with any object in its pathway ahead, side-fenders extending between the ends of the transverse fore-portion of the fender-mat and pivotal-connections provided at the pivotal parts of the fore-axle of the vehicle, and rear-extensions of said side-fenders whose inner ends engage a transverse coupling-bar at the rear of said fore-axle whereby the said side-fenders and the main fender-mat may be swung laterally in conjunction with the steering-gear and held in alinement with the front-wheels of the vehicle when turning from and to a straight path ahead.

4. In a safety-fender device for vehicles, the combination of a resilient or spring buffer having rearwardly-extending plunger-stems, a transverse rock-shaft mounted on the buffer supporting-frame, hook-arms carried by the rock-shaft and operatively-connected to said plunger-stems, rear-extensions provided on said buffer supporting-frame and pivotally-connected to the fore-axle of the vehicle, a transverse coupling-bar disposed between the said rear-extensions of the buffer-frame and adapted to be operated to swing said buffer-frame laterally, a fender-mat having a transverse picking-up or scooping fore-plate, lateral auxiliary safety-fenders extending upwardly from the opposite ends of said fore-plate in line with the fore-wheels of the vehicle, and side-fenders pivotally-connected at their fore-ends to said auxiliary lateral fenders and extending rearwardly for pivotal-connection with the said rear-extensions of the buffer-frame, whereby the said buffer-frame, fender-mat, auxiliary lateral-fenders and side-fenders are all pivotally-connected together so that they shall act together in being swung laterally with the steering-gear of the vehicle and thereby maintain proper alinement with said fore-wheels and fore-axle at all times in the running of the vehicle whether straight ahead, or on curves, or in irregular advancement thereof.

5. In a safety-fender device for vehicles, the combination of a resilient buffer having rearwardly-extending plunger-stems, a transverse rock-shaft, hook-arms extending in opposite directions vertically from said rock-shaft and operatively-connected to said plunger-stems, a transverse fender-mat hinged to the fore-end of the vehicle and adapted to be normally held in elevated position by the lower members of said hook-arms until released by contact of said buffer with an obstruction ahead and at which instant it drops into picking-up position at its fore-edge for the relief of said obstruction, a vertically-collapsible guard mat or netting adapted to be supported by the buffer-frame above the line of the buffer and held normally closed by the engagement of the upper members of said hook-arms with its upper movable or expansible member that forms the guard mat or netting when the hooks are released by the depression of the buffer on contact with obstructing objects ahead and to save said objects from injurious contact with the upper fore-part of the vehicle.

FRANCIS J. FARRELL.

Copies of this patent may be obtained for five cents each, by addressing the "Commissioner of Patents, Washington, D. C."